L. J. GEHRMANN, Jr. & F. R. C. GEHRMANN.
CORN HEADER.
APPLICATION FILED FEB. 4, 1908.
911,302.
Patented Feb. 2, 1909.
3 SHEETS—SHEET 1.
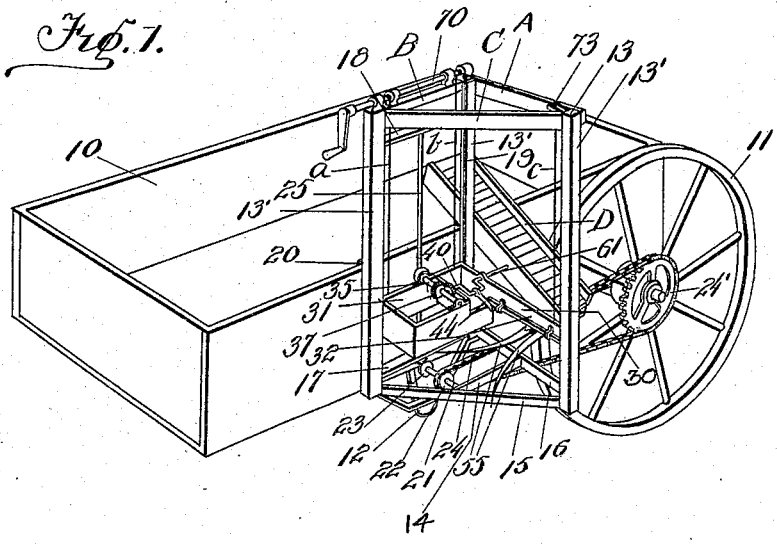
Fig. 1.
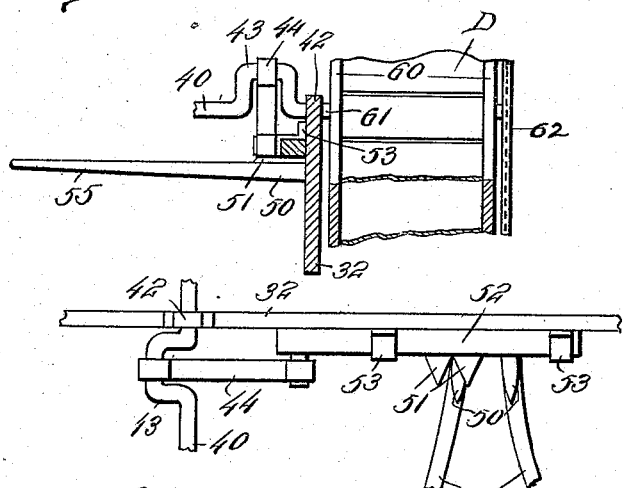
Fig. 5.
Fig. 6.
Witnesses
L. L. Armstrong
E. E. Johansen
Inventors
Louis J. Gehrmann Jr.
Frank R. C. Gehrmann
By Woodward & Chandler
Attorneys L. J. GEHRMANN, Jr. & F. R. C. GEHRMANN.
CORN HEADER.
APPLICATION FILED FEB. 4, 1908.
911,302.
Patented Feb. 2, 1909.
3 SHEETS—SHEET 2.
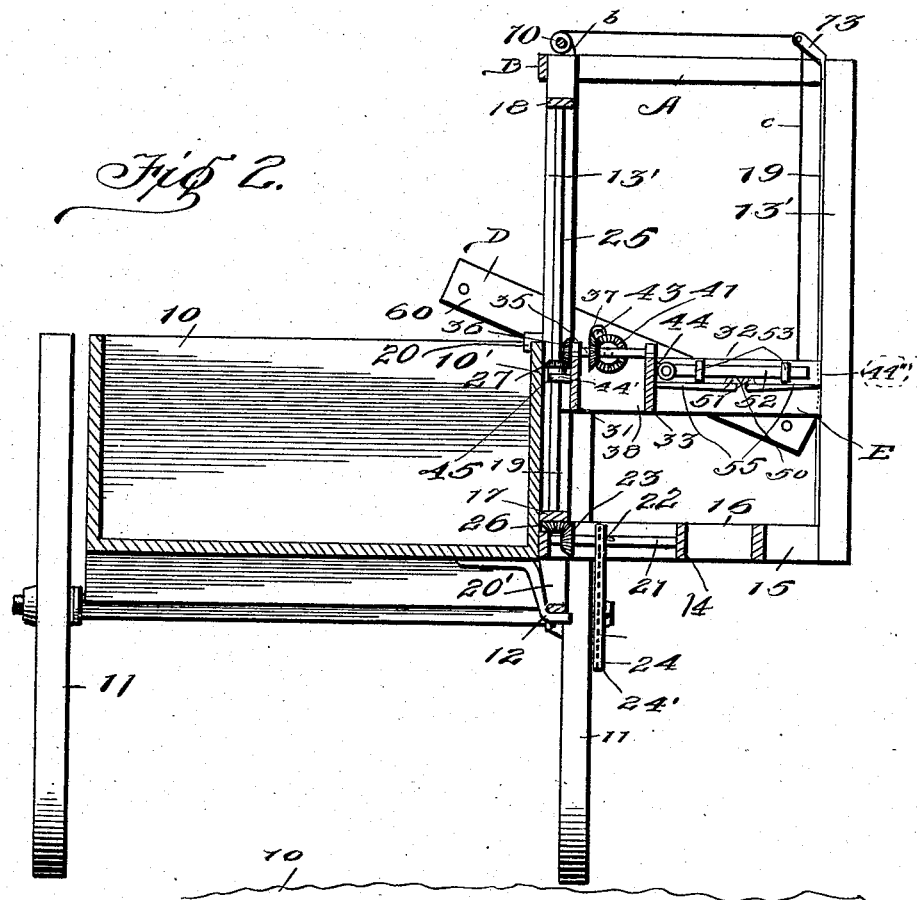
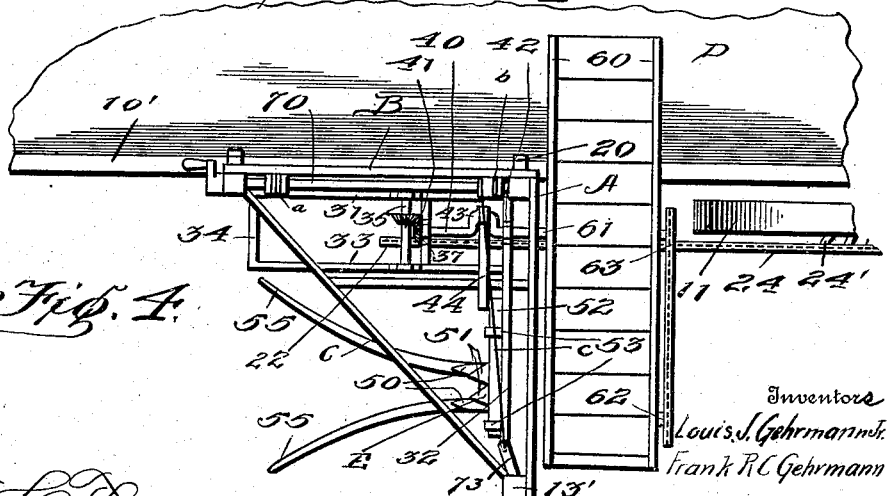

L. J. GEHRMANN, Jr. & F. R. C. GEHRMANN.
CORN HEADER.
APPLICATION FILED FEB. 4, 1908.
911,302.
Patented Feb. 2, 1909.
3 SHEETS—SHEET 3.
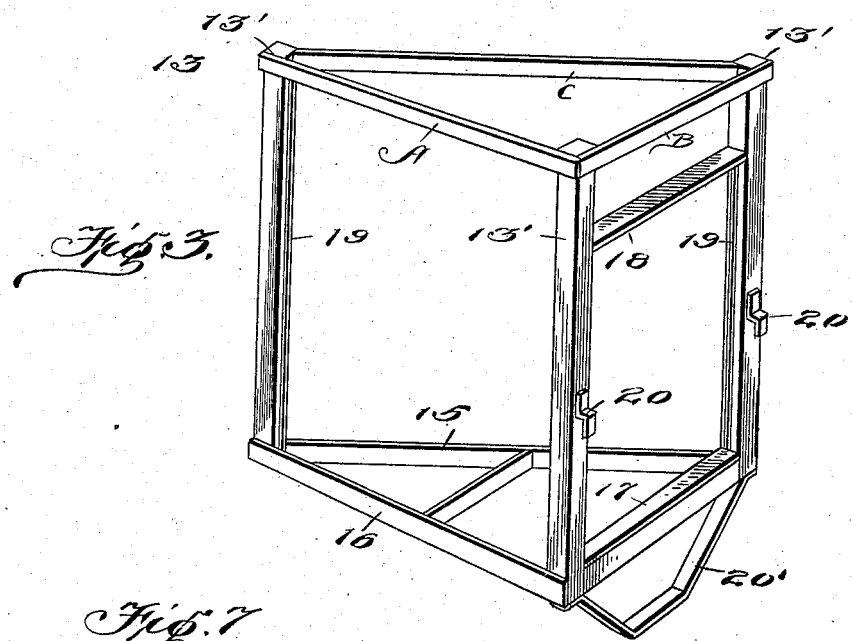
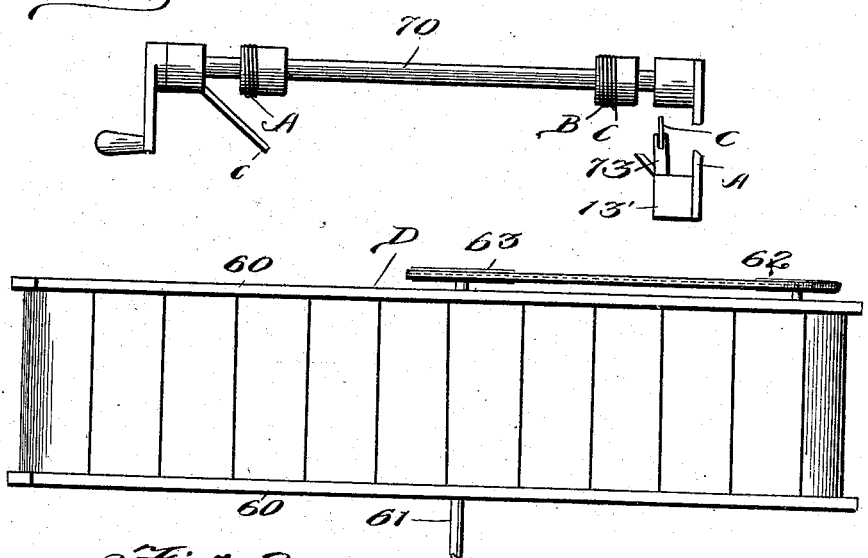

UNITED STATES PATENT OFFICE.

LOUIS J. GEHRMANN, JR., AND FRANK R. C. GEHRMANN, OF EWING, NEBRASKA.

CORN-HEADER.

No. 911,302.  Specification of Letters Patent.  Patented Feb. 2, 1909.

Application filed February 4, 1908. Serial No. 414,202.

*To all whom it may concern:*

Be it known that we, LOUIS J. GEHRMANN, Jr., and FRANK R. C. GEHRMANN, citizens of the United States, residing at Ewing, in the county of Holt and State of Nebraska, have invented certain new and useful Improvements in Corn-Headers, of which the following is a specification.

This invention relates to harvesting machinery and more particularly to machines for cutting the upper portions from growing plants, and has for its object to provide such a structure which may be detachably mounted upon an ordinary farm wagon, and operative connections made with the wheel of the wagon.

Another object is to provide a conveyer in connection with the harvester for loading the harvested material into a wagon, in order to simultaneously cut and haul the crop with one machine.

Another object is to provide a means for raising and lowering the cutting mechanism to treat plants of varying height.

Another object is to provide a machine of the kind which will be simple in structure and easy to manufacture at a low cost.

Other objects and advantages will be apparent from the following description and it will be understood that changes in the specific structure shown and described may be made within the scope of the claims without departing from the spirit of the invention.

In the drawings forming a portion of this specification and in which like numerals of reference indicate similar parts in the several views, Figure 1 is a perspective view of a wagon having the present invention attached thereto and in operation, Fig. 2 is a transverse sectional view of a wagon having the present invention mounted thereon, Fig. 3 is a perspective view of the supporting frame, Fig. 4 is a top view of a wagon having the present invention attached thereto, Fig. 5 is a sectional view vertically through the reaper section and connections, Fig. 6 is a detail of the cutting mechanism, Fig. 7 is a detail of the raising and lowering means, Fig. 8 is a detail of the conveyer and connections.

Referring to the drawings, there is shown a farm wagon of the usual type, having a wagon box 10, wheels 11, and side step 12, to which the present invention is attached.

There is seen a triangular supporting frame 13, having a rear side A and an inner side B at right angles to each other, and a front side C forming the hypotenuse of the first two sides. The frame 13 includes three uprights 13', bottom beams 15 and 16 carrying a cross beam 14 therebetween and inner side beams 17 and 18 respectively, the uprights carrying vertically extending guide rails 19 on their inner sides as shown. Clips 20 are secured outwardly of the frame 13 on its inner side and are engaged with the board 10' of the wagon box, as shown, to support the frame 13. A bracket 20' is carried at the base of the frame as shown, and engaged with the step 12, as shown. A horizontal shaft 21 extending laterally toward the wagon, is carried revolubly by the beams of the frame 13. The shaft 21 has a sprocket 22 keyed midway thereof and a beveled gear 23 at its inner end. A chain 24 is engaged over the sprocket 22 and extends rearwardly to the rear wheel 11 of the wagon where it engages over a sprocket 24' attached to the hub of the wheel 11. A vertical shaft 25 of polygonal shape in cross section is journaled midway of the inner side beams 17 and 18 inside of the frame 13, and carries at its lower end a beveled gear 26 in mesh with the gear 23 on the end of the horizontal shaft 21. A beveled gear 27 is slidably engaged upon the shaft 25 by means of a polygonal opening through the center of the gear 27 corresponding in shape to the form of the vertical shaft. A reaper section 30 is slidably mounted in the supporting frame 13, and is arranged for vertical movement in engagement with the guide rails 19. The reaper section comprises a frame having an inner beam 31 and a rear beam 32. A support 33 extends forwardly from the rear beam 32 in spaced relation with the beam 31 and is connected therewith by a brace 34 at its forward end. Guides 44' are carried at each corner of the frame of the reaper section, being engaged slidably with the vertical guide rails 19 carried by the uprights 13' of the supporting frame.

A shaft 35 is supported laterally between the beam 31 and support piece 33, having an end portion projecting beyond the inner side of the reaper frame which end portion carries a beveled gear 36 in mesh with the gear 27 on the vertical shaft 25 of the supporting frame. The gear 27 is held in such engagement by an inwardly projecting arm 44' carried by the beam 31, and having fingers 45 extending horizontally therefrom, engaged slidably under the gear 27. The shaft 35 above mentioned also carries a beveled gear 37 keyed midway thereof. A bearing 38 is carried between the beam 31 and the support piece 33 parallel with the shaft 35 and receives therethrough the end of a shaft 40 carrying a gear 41 in mesh with the gear 37 on the shaft 35, the shaft 40 extending rearwardly through and beyond a bearing 42 on the rear beam 32 to support a conveyer D, which will be described. A crank 43 is formed in the shaft 40 forwardly of the beam 32 having a connecting rod 44 engaged thereon to operate a cutting mechanism E of the usual oscillating type carried near the outer end of the rear beam 32. The cutting mechanism comprises forwardly extending rigid fingers 50 and knives 51 arranged for reciprocal movement therebetween, being carried by a bar 52 slidably engaged in guides 53 and engaged with the connecting rod 44 by means of a pin 54. Oppositely extending grain guides 55 are attached at each side of the fingers 50 to guide the tops of plants into the cutters when the machine is moved forward in operation.

The elevator D consists of a belt conveyer of the usual type, having side stringers 60 resting upon the projecting end portion 61 of the shaft 40 and having a pulley 62 at one end connected by a belt or chain with a pulley 63 carried at the end of the shaft 40. One end of the conveyer is disposed immediately behind and below the cutting mechanism and the opposite end projects laterally beyond the inner side of the supporting frame and over the wagon body, as shown, the side 10 of the body serving to support the adjacent end of the conveyer. It will be understood that the conveyer may be detachably secured to the sides of the wagon, to prevent the conveyer from turning pivotally outward.

A hoisting mechanism is arranged upon the top of the frame 13, comprising a shaft 70 mounted upon the inner uprights 13' having a winding drum thereon from which cables a, b, and c, respectively, extend to the three corners of the reaper section, as shown, the cable c being carried over a pulley 73, carried by the outer upright 13'.

It will be apparent from the preceding description that a heading machine is provided which may be mounted upon the side of a wagon and operative connections made with a wheel thereof. It will be seen also that the cutting mechanism may be directed to cut plants at any desired height, the severed portions falling upon a conveyer and being loaded into the wagon upon which the machine is mounted.

What is claimed is:

1. A harvesting mechanism comprising a supporting frame arranged for detachable engagement with the side of a wagon, a vertical shaft carried revolubly by the supporting frame, operative connections engaged with the vertical shaft and arranged for engagement with a wagon wheel, a reaper section carried by the supporting frame and arranged for vertical sliding movement therein, operative connections between the reaper section and the vertical shaft, means for raising and lowering the reaper section to treat plants of varying height, a conveyer carried by the reaper section and arranged to convey cut material from the reaper section to an adjacent wagon body, and operative connections between the conveyer and the reaper section.

2. A harvesting mechanism, comprising a supporting frame arranged for detachable engagement with the side of a wagon, a vertical shaft carried revolubly by the supporting frame, operative connections engaged with the vertical shaft and arranged for engagement with a wagon wheel, a reaper section carried by the supporting frame and arranged for vertical sliding movement thereon, a cutting mechanism carried by the reaper section, operative connections between the cutting mechanism and the vertical shaft, means for raising and lowering the reaper section to treat plants of various heights, a conveyer carried by the reaper section, and arranged to convey harvested material to an adjacent wagon body, and operative connections between the conveyer and the said vertical shaft.

3. A harvesting mechanism arranged for detachable engagement with a wagon, and having operative connections arranged for engagement with the wagon wheel, said harvester including a supporting frame, a cutting mechanism carried movably in said frame for vertical sliding movement during operation, said mechanism including a cutting mechanism, an operating shaft engaged with said cutting mechanism, and having an outwardly projecting end portion, a conveyer supported pivotally on said projecting end portion of the shaft, said conveyer being arranged to engage against the sides of an adjacent wagon body, and arranged to carry harvesting material thereinto, and operative connections between said conveyer and said projecting end portion of the shaft.

In testimony whereof we affix our signatures, in presence of two witnesses.

LOUIS J. GEHRMANN, Jr.
FRANK R. C. GEHRMANN.

Witnesses:
J. L. FISHER,
T. TOMJACK, Jr.